United States Patent
Staelin et al.

(10) Patent No.: US 7,409,372 B2
(45) Date of Patent: Aug. 5, 2008

(54) NEURAL NETWORK TRAINED WITH SPATIAL ERRORS

(75) Inventors: Carl Staelin, Haifa (IL); Darryl Greig, Haifa (IL); Manl Flacher, Haifa (IL); Ron Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 10/600,671

(22) Filed: Jun. 20, 2003

(65) Prior Publication Data

US 2004/0260662 A1 Dec. 23, 2004

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)
*G06N 3/00* (2006.01)
*G06N 3/08* (2006.01)

(52) U.S. Cl. .......................... 706/15; 706/16
(58) Field of Classification Search .................. 706/45; 382/155, 254, 293, 298
See application file for complete search history.

(56) References Cited

U.S. PATENT DOCUMENTS

| | | | | |
|---|---|---|---|---|
| 5,548,684 A * | 8/1996 | Wang et al. | ..................... | 706/16 |
| 5,550,937 A * | 8/1996 | Bell et al. | ..................... | 382/293 |
| 5,826,249 A * | 10/1998 | Skeirik | ..................... | 706/25 |
| 5,961,571 A * | 10/1999 | Gorr et al. | ..................... | 701/207 |
| 6,169,981 B1 * | 1/2001 | Werbos | ..................... | 706/23 |
| 6,236,365 B1 * | 5/2001 | LeBlanc et al. | ............. | 342/457 |
| 6,381,341 B1 * | 4/2002 | Rhoads | ..................... | 382/100 |
| 6,470,094 B1 * | 10/2002 | Lienhart et al. | ............. | 382/176 |
| 6,473,522 B1 * | 10/2002 | Lienhart et al. | ............. | 382/168 |
| 6,553,129 B1 * | 4/2003 | Rhoads | ..................... | 382/100 |
| 6,567,533 B1 * | 5/2003 | Rhoads | ..................... | 382/100 |
| 6,581,048 B1 * | 6/2003 | Werbos | ..................... | 706/23 |
| 6,640,215 B1 * | 10/2003 | Galperin et al. | ............... | 706/19 |
| 6,681,029 B1 * | 1/2004 | Rhoads | ..................... | 382/100 |
| 6,687,657 B2 * | 2/2004 | Levin | ..................... | 702/189 |
| 6,700,990 B1 * | 3/2004 | Rhoads | ..................... | 382/100 |
| 6,775,392 B1 * | 8/2004 | Rhoads | ..................... | 382/100 |
| 6,952,181 B2 * | 10/2005 | Karr et al. | ..................... | 342/457 |
| 6,959,109 B2 * | 10/2005 | Moustafa | ..................... | 382/159 |
| 7,054,465 B2 * | 5/2006 | Rhoads | ..................... | 382/100 |
| 7,171,016 B1 * | 1/2007 | Rhoads | ..................... | 382/100 |
| 2004/0114826 A1 * | 6/2004 | Bhattacharjya | ............. | 382/274 |

OTHER PUBLICATIONS

Choosing the optimal neighbourhood size in optical low problems with errors-in-variables modelling Ng. L.; Solo, V.; Image Processing, 1998. ICIP 98. Proceedings. 1998 International Conference on vol. 2, Oct. 2-4, 1998 pp. 186-190 vol. 2.*

(Continued)

*Primary Examiner*—Michael B Holmes

(57) ABSTRACT

A neural network is trained with input data. The neural network is used to rescale the input data. Errors for the rescaled values are determined, and neighborhoods of the errors are used adjust connection weights of the neural network.

37 Claims, 7 Drawing Sheets

OTHER PUBLICATIONS

Comparison of neural networks to standard techniques for image classification and correlation Paolo, J.D.; Schowengerdt, R.A.; Geoscience and Remote Sensing Symposium, 1994. IGARSS '94. Surface adn Atmospheric Remote Sensing: Technologies, Data Analysis and Interpretation., International vol. 3, Aug., 1994 pp. 1404-1406 vol. 3.*

Multi-sensor fusion model for constructing internal representation using autoencoder neural networks Yaginuma, Y.; Kimoto, T.; Yamakawa, H.; Neural Networks, 1996., IEEE International Conference on Vol. 3, Jun. 3-6, 1996 pp. 1646-1651 vol. 3 Digital Object Identifier 10.1109/ICNN.1996.549147.*

Digital mammography: mixed feature neural network with spectral entropy decision for detection of microcalcifications Baoyu Zheng; Wei Qian; Clarke, L.P.; Medical Imaging, IEEE Transactions on vol. 15, Oct. 1996 pp. 589-597 Digital Object Identifier 10.1109/42.538936.*

A fast learning algorithm for Garbor transform with applications to image data reduction and pattern classification Ibrahim, A.E.; Azimi Sadjadi, M.R.; Sheedvash, S.; Neural Networks, 1994. IEEE World Congress on Computational Intelligence., 1994 IEEE International Conference on vol. 7, Jun. 27-Jul. 2, 1997 pp. 4321-4326 vol. 7.*

Principal component extraction using recursive least squares learning Bannour, S.; Azimi-Sadjadi, M.R.; Neural Networks, IEEE Transactions on vol. 6, Issue 2, Mar. 1995 pp. 457-469 Digital Object Identifier 10.119/72.363480.*

The use of multilayered perceptrons for remote sensing classification with temporal data German, G.W.H.; Neural Networks, 1995. Proceedings., IEEE International Conference on vol. 4, Nov. 27-Dec. 1, 1995 pp. 1694-1698 vol.4 Digital Object Identifier 10.1109/ICNN.1995.488874.*

Noise removal from image data using recursive neuro-fuzzy filters Russo, F.; Instrumentation and Measurement Technology Conference, 1999. IMTC/99. Proceedings of the 16th IEEE vol. 3, May 24-26, 1999 pp. 1818-1822 vol. 3 Digital Object Identifier 10.1109/IMTC.199.776134.*

* cited by examiner

NEURAL NETWORK TRAINED WITH SPATIAL ERRORS

BACKGROUND

Image upscaling typically involves magnifying an entire image or a portion of an image. For example, an image upscaled by a factor of two may have a 2×2 block of pixels corresponding to each pixel in the original image. Pixel values in each 2×2 block of the upscaled image are predicted from pixel values in the original image.

The pixels may be predicted by traditional methods such as bilinear interpolation and bi-cubic interpolation, which involve the use of weighted sums of neighboring pixels to predict the pixel values. However, these traditional methods tend to produce blurring in upscaled images. The blurring is especially noticeable at edges of the upscaled images.

Neural networks can be used to perform image upscaling. The neural networks can be trained to predict values for the upscaled image.

A neural network is typically trained to fit models that produce images having a high peak signal to noise ratio (PSNR). The standard error measure used in neural network training is the sum of square error (SSE). The SSE is inversely related to the PSNR between the upscaled image and a true representation of the image (e.g., a true high resolution image).

Although the neural networks tend to reduce edge blurring, they tend to produce visual artifacts near edges and textured regions. These artifacts can degrade image quality.

SUMMARY

According to one aspect of the present invention, a neural network is trained with input data. The neural network is used to rescale the input data. Errors for the rescaled values are determined, and neighborhoods of the errors are used adjust connection weights of the neural network.

Other aspects and advantages of the present invention will become apparent from the following detailed description, taken in conjunction with the accompanying drawings, illustrating by way of example the principles of the present invention.

DETAILED DESCRIPTION

Figure 1:
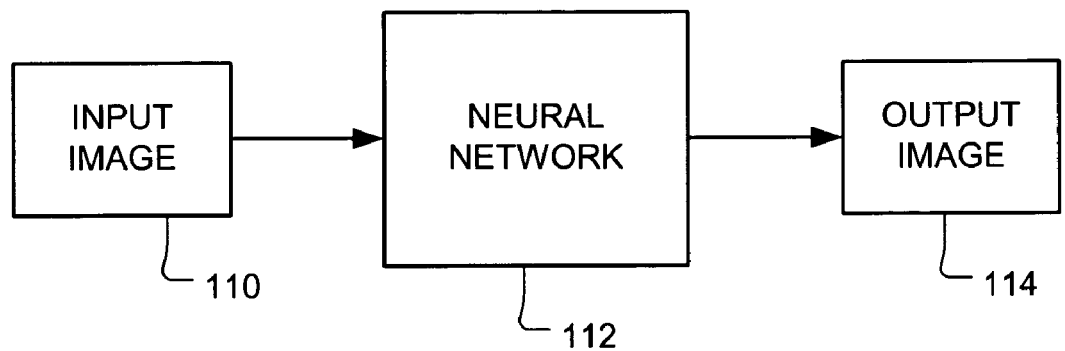
FIG. 1 is an illustration of a method of upscaling a digital image in accordance with an embodiment of the present invention.

Reference is made to FIG. 1. An input digital image 110 is supplied to a neural network 112, which has already been trained to perform image upscaling. The neural network 112 processes a luminance channel of the input image 110, one pixel at a time, to produce an upscaled luminance image 114. Each pixel value in the upscaled luminance image 114 is predicted by the neural network 112. The neural network 112 can be configured to process a fixed size window of input pixels, and outputs one or more pixels at a time.

Figure 2:
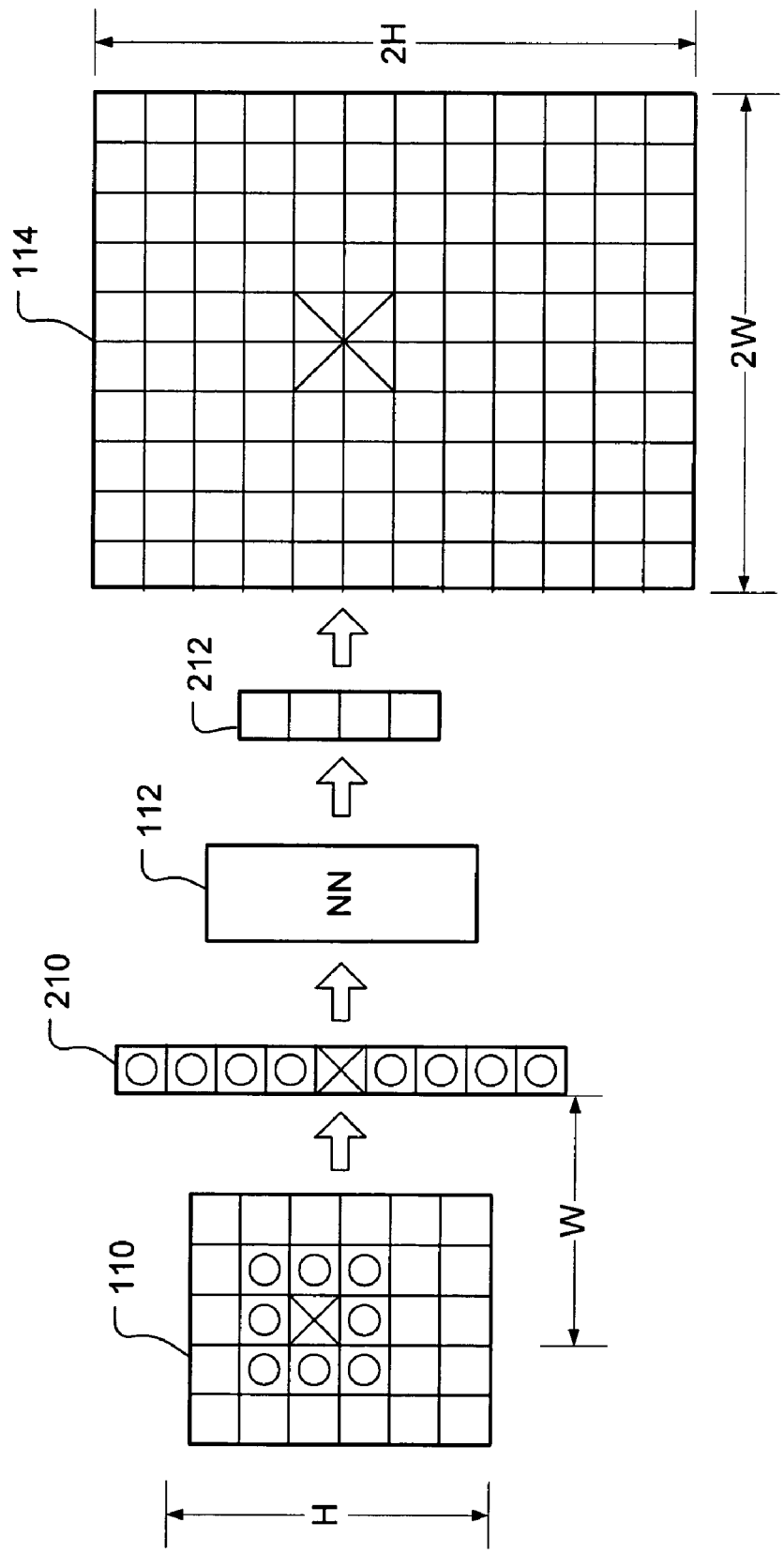
FIG. 2 is an illustration of upscaling an input pixel.

Additional reference is made to FIG. 2, which illustrates an example of factor two upscaling. A 3×3 neighborhood 210 of input pixels is supplied to the neural network 112. The pixel being processed is denoted by an "X" and the neighboring pixels are denoted by an "O." In response, the neural network 112 outputs a 2×2 block 212 of pixels for the upscaled luminance image 114. The pixels in the input image 110 are processed one at a time. The factor two upscaling produces an upscaled luminance image 114 that has twice the height (2H) and twice the width (2W) as the luminance channel of the input image 110.

The neural network 112 is defined by its nodes, connections, and connection weights. A weight vector is the vector of connection weights between each pair of connected nodes in the neural network 112. Training involves optimizing these weight values so as to reduce the error between the upscaled image and a true high-resolution representation of the upscaled image The true high-resolution representation of the upscaled image will be referred to as a "target" image.

The neural network 112 is trained with spatial error measures. Spatial error measures take into account not only the relationship of a predicted value in the upscaled image to a pixel value in the target image, but also the relationship of predicted values of neighboring pixels in the upscaled image to corresponding values in the target image (for images, neighboring pixels are in close proximity to the pixel being processed).

A general measure for spatial error may be derived as follows. Let Z denote the upscaled image 114 produced by the neural network 112, let $z_{i,j}$ denote the i,j$^{th}$ pixel in the upscaled image 114, let T denote the target image, and let $t_{i,j}$ denote the i,j$^{th}$ pixel in the target image T. The total error E between the upscaled image Z and the target image T may be given by the following error function:

$$E(Z, T) = \sum_{i,j} S(v(z_{i,j}), v(t_{i,j}))$$

where v denotes the vector of pixels in some pre-specified neighborhood around its argument, $z_{i,j}$ and $t_{i,j}$ denote the (i,, j)$^{th}$ pixels of the output and target images, and S is a differentiable function (e.g., $z_{i,j} - t_{i,j}$).

One way of training with the spatial error measure involves taking the full derivative of upscaled image error with respect to an output image pixel ($z_{i,j}$). This derivative may be computed as the sum of the partial derivatives of the pixels in a spatial neighborhood:

$$\frac{\partial E(Z, T)}{\partial z_{i,j}} = \sum_{k,l:z_{i,j} \in V(z_{i,j})} \frac{\partial S(v(z_{k,l}), v(t_{k,l}))}{\partial z_{i,j}}$$

Thus the full derivative considers the effect of every pixel in a spatial neighborhood $v(z_{k,l})$ such that $z_{i,j} \in v(z_{k,l})$.

Figure 3A:
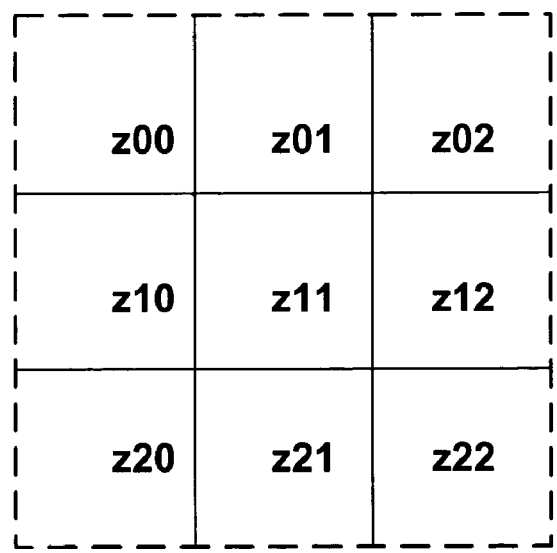
FIG. 3a is an illustration of a pixel neighborhood.

The size of the spatial neighborhood $v(z_{k,l})$, which is used in the spatial error measure, may depend upon the scaling factor, or it may be predetermined. For example, the 3×3 neighborhood illustrated in FIG. 3a may be used. The pixel being processed is denoted by $z_{1,1}$, and the neighboring pixels are denoted by $z_{0,0}$, $z_{0,1}$, $z_{0,2}$, $z_{1,0}$, $z_{1,2}$, $z_{2,0}$, $z_{2,1}$, and $z_{2,2}$. The derivative of upscaled image error with respect to the pixel being processed would be $$\frac{\partial E(Z,T)}{\partial z_{1,1}} = \frac{\partial S(z_{0,0}, t_{0,0})}{\partial z_{1,1}} + \frac{\partial S(z_{0,1}, t_{0,1})}{\partial z_{1,1}} + \frac{\partial S(z_{0,2}, t_{0,2})}{\partial z_{1,1}} + \frac{\partial S(z_{1,0}, t_{1,0})}{\partial z_{1,1}} + \frac{\partial S(z_{1,1}, t_{1,1})}{\partial z_{1,1}} + \frac{\partial S(z_{1,2}, t_{1,2})}{\partial z_{1,1}} + \frac{\partial S(z_{2,0}, t_{2,0})}{\partial z_{1,1}} + \frac{\partial S(z_{2,1}, t_{2,1})}{\partial z_{1,1}} + \frac{\partial S(z_{2,2}, t_{2,2})}{\partial z_{1,1}}.$$

Figure 3B:
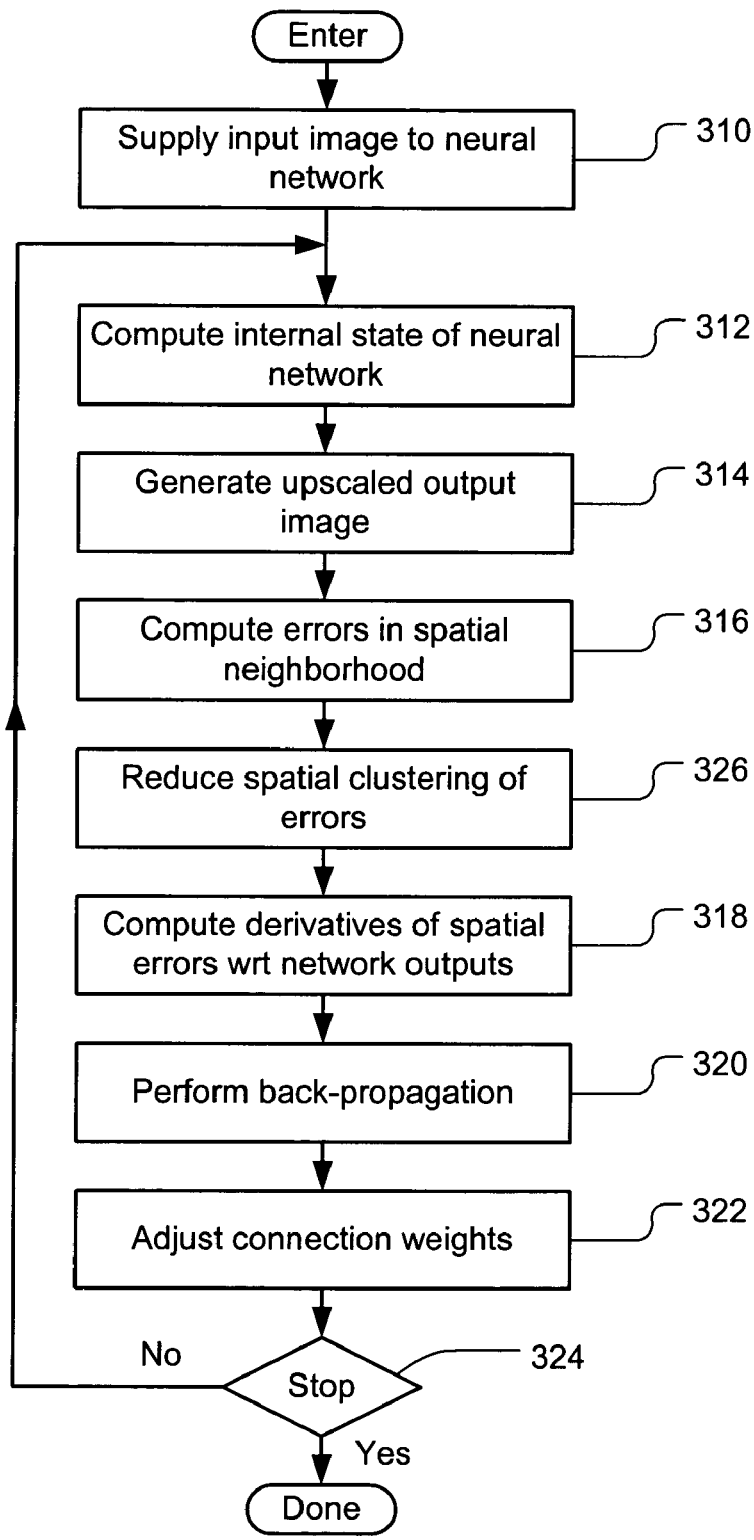
FIG. 3b is an illustration of a method of training a neural network to upscale a digital image in accordance with an embodiment of the present invention.

Reference is now made to FIG. 3b, which illustrates a method of training the neural network with the spatial error measure. A high resolution image is used as a target image T. The target image T may be downsampled (e.g., by pixel averaging) to produce a corresponding low resolution (input) image X. The downsampling is not limited to any particular scheme.

The input image X is supplied to the neural network (310). The neural network forward-propagates this low resolution image X to compute values of the nodes (312). The connection weights are used to compute these node values. During forward propagation, values from the hidden and output nodes may be obtained by computing the network weighted sum in a progressive manner. For example, the input to a first hidden node is the weighted sum of the inputs from the given input pattern. The weights used for the weighted sum are the current values of the connections between the inputs and the first hidden unit. The output of the first hidden node is the hyperbolic tangent of the input. Once this is computed, the input to the second hidden unit is computed as the appropriate weighted sum of the inputs and the output of the first hidden node, and so forth.

The output values from the output nodes represent the current network prediction for the corresponding high resolution pixel values, possibly transformed by some scaling function (314). The internal state may be saved in a buffer for referral when all the outputs in the neighborhood $v(z_{i,j})$ have been computed. Resolution of the output image z matches the resolution of the target image T.

Errors in a spatial neighborhood are computed (316). An error image may be formed from the upscaled and target errors. For example, the error image may be formed by subtracting the upscaled image from the target image.

Derivatives of the spatial errors are computed with respect to the network outputs (318). The derivative for a predicted pixel in the output image z is a function of differences between predicted values in a spatial neighborhood and the corresponding values in the target image. The following simple function serves to illustrate for a 3×3 neighborhood:

$$E_{i,j} = (z_{i,j} - t_{i,j}) \sum_{(k,l) \in v(i,j)} (z_{k,l} - t_{k,l})$$

-continued $$\frac{\partial E_{i,j}}{\partial z_{i,j}} = \sum_{(k,l) \in v(i,j)} (z_{k,l} - t_{k,l}) + (z_{i,j} - t_{i,j})$$

where the second term in the derivative results from the fact that $(i,j) \in v(i,j)$. Thus each derivative is the sum of partial derivatives of the pixels in a spatial neighborhood.

Since the error measure for a pixel $z_{i,j}$ is computed with respect to its spatial neighborhood, the full derivative of that pixel $z_{i,j}$ is not known until the partial derivates of all of the pixels in a neighborhood have been computed.

The full derivative for each pixel may be computed incrementally. For each pixel in the output image z, the neural network computes its contribution to the network error $S(v(z_{i,j}), v(t_{i,j}))$ and the partial derivative of $t_{i,j}$ of each with respect to that pixel. The partial derivatives may be added to cumulative sums, which are stored in a buffer. Once the partial derivatives for all pixels in a spatial neighborhood have been computed and added to the buffer, the full derivative for the pixel $z_{i,j}$ is complete.

Once the full derivatives for the pixels in the output image z have been generated, back-propagation is performed to compute error gradients (320). The error gradients may be computed as derivatives of the network output with respect to the network weights. The back-propagation may be performed in a conventional manner. For example, using the chain rule of differentiation, the derivative of the network error may be expressed with respect to the network weights as a product of the derivatives of the network error with respect to the network output and the derivatives of the network output with respect to the network weights.

Instead of computing the derivatives for all of the pixels in the upscaled image and then performing back-propagation, each full derivative can be back-propagated as it becomes available. That is, a full derivative can be back-propagated once the partial derivatives for an entire neighborhood have been computed.

The error gradients are used to adjust the node weights to reduce the network errors (322). This may be done in a conventional manner. The error gradients may be used iteratively to find weights that result in a lower error value.

Second and subsequent iterations may then be performed until a stopping criteria is reached (324). For each iteration (312-322), an upscaled image is generated from the input image and the adjusted weights (314), errors are computed (316), derivatives are computed from the errors (318), back-propagation is performed (320), and node weights are further adjusted (322).

The stopping criteria may be one of the following, or a combination of the following (the following stopping criteria is exemplary, not exhaustive):

(1) The neural network error derivative is within a threshold.
(2) The neural network error is within a threshold.
(3) The neural network has completed a maximum number of training iterations.
(4) The neural network has achieved a spatial error minimum when evaluated on an independent validation set.

The spatial error measure is not limited to computing derivatives with respect to pixel neighborhoods. The spatial error measure may also involve reducing the clustering of undesirable spatial patters of errors (326). Visible artifacts can be caused by spatially clustered errors (uniformly distributed white noise, in contrast, is much less irritating and much less visible to the human eye). Reducing the spatial error clustering can reduce artifacts near edges and textured regions of the upscaled image. Artifacts that are visually disturbing often correspond to local correlations in the error surface. For example, a checkerboard pattern in the errors along a diagonal edge may correspond to staircasing, and parallel straight lines along an edge may correspond to smoothing or over-sharpening artifacts. By reducing the spatial error clustering, the neural network can produce images of high perceptual quality, as opposed to images simply having high PSNR.

The spatial clustering of errors may be reduced by identifying patterns of errors in the error image (which was computed at step 316), and "punishing" spatially correlated errors. As a result, spatially undesirable errors patterns are decorrelated. These steps may be performed at each iteration of training. The neural network can identify recognizable features such as horizontal and vertical edges and diagonal lines and use these patterns to reduce the spatial correlation of the errors, which can reduce the visual artifacts in the image. The spatially correlated errors may be punished by uncorrelating the errors (e.g., reducing the values of certain errors).

One way to identify patterns in the error image is to use a function called a pattern detector. The pattern detector operates on a neighborhood the same size or smaller than the error neighborhood. If the pattern detector is smaller, then a larger pattern detector may be simulated by aggregating the results of applying the pattern detector to the whole error neighborhood in a sliding window fashion.

Figure 4:
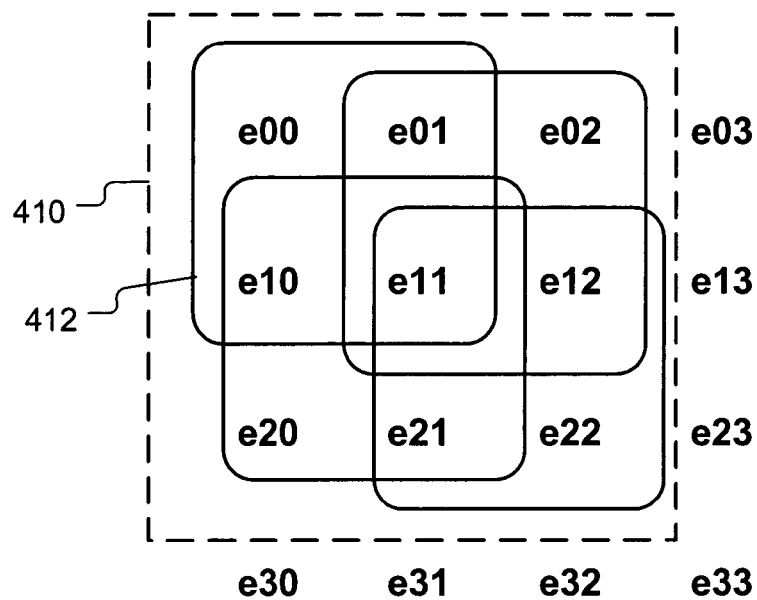
FIG. 4 is an illustration of a pattern detector for identifying spatially correlated errors in an error image.

FIG. 4 illustrates a group of 2×2 pattern detectors for a 3×3 error neighborhood 410. This 3×3 neighborhood 410 is made up of the four 2×2 sub-neighborhoods 412. The errors on each of these sub-neighborhoods 412 is summed up to give the overall error for the central pixel (e11).

Consider the following error surface pattern from a 2×2 sub-neighborhood:

$$\begin{bmatrix} + & - \\ - & + \end{bmatrix}$$

This error pattern suggests a diagonal line in the error image, which is consistent with an artifact along diagonal lines in the upscaled image. The diagonal error pattern might arise from staircasing, blocking or blurring artifacts in texture or diagonal lines.

Similarly, the following error patterns suggest horizontal and vertical lines in the error image.

$$\begin{bmatrix} + & + \\ - & - \end{bmatrix}, \begin{bmatrix} + & - \\ + & - \end{bmatrix}$$

These error patterns might arise from overshoot, undershoot or blurring in horizontal and vertical lines.

The neural network can scan an error neighborhood for recognizable patterns. For patterns that are detected, the values of the errors and/or derivatives can be modified to reduce spatial clustering.

An example will now be provided for a 3×3 error neighborhood and 2×2 pattern detector. In this example, error is given as $e_{i,j}=z_{i,j}-t_{i,j}$, and the vector of errors in a neighborhood $v(e_{i,j})$ is given as $v(e_{i,j})=[e_{i-1,j-1}, e_{i-1,j}, e_{i,j-1}, e_{i,j}]$. The following error patterns (diagonal, horizontal, vertical) can be detected from $v(e_{i,j})$.

| Condition | Pattern |
|---|---|
| $(e_{i-1,j-1}) e_{i,j} + (e_{i-1,j})(e_{i,j-1})$ has a large, positive value | Diagonal |
| $(e_{i-1,j-1}) e_{i-1,j} + (e_{i,j-1})e_{i,j}$ has a large, positive value | Horizontal |
| $(e_{i-1,j-1}) e_{i,j-1} + (e_{i-1,j})e_{i,j}$ has a large, positive value | Vertical |

Spatially correlated errors may be punished as follows. The derivative of total error with respect to a predicted value is proportional to a product of a penalty matrix A and the vector $v(e_{i,j})$ describing the errors in the neighborhood of the $i,j^{th}$ pixel. In general, the total image error may be expressed as, $$E(Z,T) = \sum_{i=1}^{n}\sum_{j=1}^{m} v(e_{i,j})^T A v(e_{i,j})$$

The penalty matrix A for a group of 2×2 detectors may have the form $$A = \begin{bmatrix} \alpha & \beta & \gamma & \delta \\ \beta & \alpha & \delta & \gamma \\ \gamma & \delta & \alpha & \beta \\ \delta & \gamma & \beta & \alpha \end{bmatrix}$$

where A is a positive definite matrix; where α is a penalty on the total error (regardless of patterns), β is a penalty on horizontal error patterns, γ is a penalty on vertical errors patterns, and δ is a penalty on diagonal error patterns; and where features are scaled such that features with large variances are not weighted more than features with small variance. For penalties within the range [0,1], the value 1 could signify minimum penalty, and the value 0 could signify maximum penalty. However, the penalties are not restricted to such a range. Other penalty values satisfying the positive definite criteria may be used.

The contribution to the total error ($e_{1,1}$) at the pixel $z_{1,1}$ is given by $$E(z_{1,1}, t_{1,1}) = v(e_{1,1})^T A v(e_{1,1})$$

where $e_{1,1}=z_{1,1}-t_{1,1}$. The derivatives of $E_{1,1}$ are given by $$\frac{\partial E_{1,1}}{\partial z_{1-k,1-l}} = 2A_{3-l-2k} v(e_{1,1})$$

for $z_{1-k}, 1_{1-k}$ where $k, l \in 0,1$; and where $A_m$ is the $m^{th}$ row of the matrix A.

Using this expression, and similar expressions for $e_{1,2}, e_{2,1}$ and $e_{2,2}$, the derivative of the total error with respect to $z_{i,j}$ may be computed as $$\frac{\partial E}{\partial z_{i,j}} = 2A_0 v(e_{i+1,j+1}) + 2A_1 v(e_{i,j+1}) + 2A_2 v(e_{i+1,j}) + 2A_3 v(e_{i,j})$$

This error may be back-propagated once $e_{2,2}$ has been computed.

The training is not limited to any particular neural network architecture. An exemplary feed-forward neural network architecture may have linear output nodes and tanh activation in the hidden nodes. Each input node is connected to each hidden and output node, and the connection weight between the $i^{th}$ and $j^{th}$ nodes is represented as $w_{i,j}$.

The hidden nodes are ordered, and each hidden node is connected to each subsequent hidden node and to each output node. The first input is a bias input with a constant value of one. Each network node has an index, with index 0 being the bias input, indices 1 to $N_{in}$, corresponding to the input nodes, indices $N_{in}+1$ to $N_{in}+N_{hid}$ corresponding to the hidden nodes, and indices $N_{in}+N_{hid}+1$ to $N_{in}+N_{out}$ corresponding to the output nodes.

The output function for the $i^{th}$ node (input, output or hidden) may be represented in terms of previous hidden and input nodes as follows:

$$a_i = \tanh\left(\sum_{j=0}^{i-1} w_{i,j} x_j\right)$$

where $a_i$ represents the $i^{th}$ output node. Since the output nodes are linear, the output of the $i^{th}$ node may be represented in terms of previous output, hidden and input nodes as follows.

$$a_i = \sum_{j=0}^{i-1} w_{i,j} x_j$$

Figure 5:
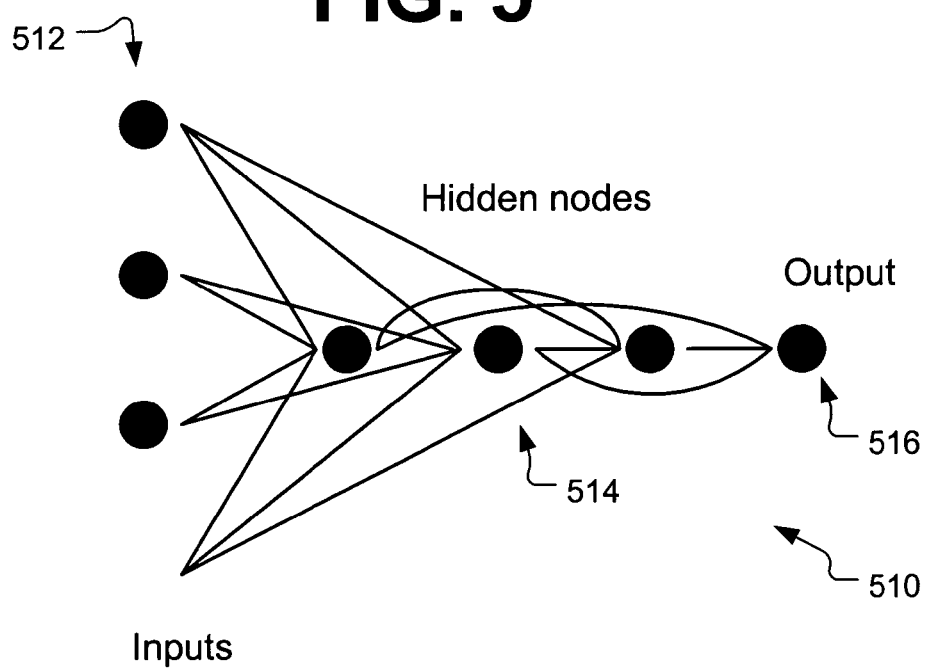
FIG. 5 is an illustration of an exemplary neural network architecture.

A generalized feedforward network of any given size can mimic any layered architecture with an equivalent number of total hidden nodes. For example, the feedforward neural network 510 illustrated in FIG. 5 has three inputs 512, three hidden nodes 514, and a single output node 516. In practice very few hidden nodes 514 are needed to provide satisfactory results. In particular, neural networks with as few as ten hidden nodes 514 can yield satisfactory results.

Input and output values of the neural network may be coded to improve the neural network accuracy. The coding may be performed to fit the input and output values within a range (e.g., [−1,1]). This is done to better suit the dynamic range of the activation functions, and also to minimize the dimensionality of the input/target space. Exemplary coding schemes include simple coding, relative coding, and scaled coding.

In simple coding, each pixel value is scaled to the range [0 . . . , 1] by dividing by 255 (for eight-bit values), and each output is then converted to a pixel value by multiplying by 255. This transformation ensures that the network inputs will always fall between −1 and 1

In relative coding, simple coding is performed on each input pixel, and the value of the central input pixel (which is the one that will be replaced by the output pixels) is subtracted. Inputs and outputs are in the range [−1, . . . , 1]. The outputs are similarly added to the central input pixel value before the value is multiplied by 255. The relative coding makes it easier for the neural network to recognize edges and features. This has the effect of adjusting the DC level and making edges the same, regardless of their grey level. For example, an edge is treated as an edge no matter what the contrast between the sides is, and no matter which overall gray-level occurs.

In scaled coding the relative coding is computed. Then the inputs and outputs are scaled by a dynamic range of the inputs, so the inputs are always "stretched" to [−1, . . . , 1].

Unlike relative coding, scaling coding produces edges that have similar dynamic ranges. As a benefit, the network only learns about the shape of edges, and not edge height. For example, in relative coding, an edge with a difference of 70 gray levels would look significantly different than the same edge with a difference of 150 gray levels. Using scaled coding, the neural network can recognizes the edge without concern about the height.

The training described above is performed with a single input image. However, the training is not so limited. The neural network can be trained on a set of images. The images in the training set may include a reasonable collection of good and hopefully representative images with various "types" of images, such as people, landscapes, man-made objects, still life, text, etc.

Batch back-propagation may be performed, in which the network error and derivatives is computed for all input images (i.e., the errors and partial derivatives are summed over all input images), and then the connection weights are updated.

Second and subsequent iterations may then be performed until a measure of quality is achieved. For each iteration, the derivatives for all images are computed again, and another attempt is made to minimize the weight error.

In the alternative, the training may be performed over multiple runs. For example, a first training run involves only a small set of training images and results in the neural network being near the desired point. A second training run based on a larger number of input images is then performed until the neural network satisfies a stopping criteria.

The manner in which the input images are generated is not limited to downsampling of the target images. Consider the example in which the input and target images are JPEG images. The input and target JPEG images could be obtained by compressing an original image according to different scale factors (e.g., a scaling factor of 1× for the target images).

The neural network training is not limited to recognizing features such as horizontal and vertical edges and diagonal lines in the error image. A more sophisticated detection scheme could be used to identify other artifacts that are visible. For example, sloped lines (e.g., lines at 22.5 degrees) could be identified.

The spatial error neighborhood is not limited to 3×3. Other sizes and shapes could be used.

The neural network training is not limited to using pattern detectors that operate on windows smaller than the spatial error neighborhood. Larger pattern detectors may be used; however, by using the smaller pattern detectors, it is easier to ensure that the A-matrix is positive definite.

The neural network training is not limited to using an A-matrix for punishing spatially correlated errors. For example, the neural network could penalize spatially correlated errors by setting the error to be the sum of the squared raw errors in a neighborhood, with the errors weighted by a Gaussian envelope. The neural network could minimize error correlations by penalizing according to the correlation function of the raw errors; or by penalizing spatially correlated errors by setting the error to be the sum of the squared raw errors in a neighborhood, with the errors weighted by some envelope/weighting function.

The neural network could use a combination of spatial errors and SSE. As a first example, the neural network could reduce blurring by punishing pixels at an edge boundary whose values are between the low and high edge values, and using sum of squared error (SSE) otherwise. A blurred edge has a sloped transition from high to low (i.e., at least one pixel has an intermediate value between the high and low edge values). In contrast, a crisp edge will have an abrupt transition from low to high with no intermediate values. In general crisp edges are visually preferable to smoothed or blurred edges, but when the exact edge location is indeterminate, SSE tends to reward a conservative strategy (i.e., adding one or more pixels with the intermediate value (the penalty for a wrong guess about crisp edges is greater than the penalty for a wrong guess about blurred edges). To encourage crisp edges, the penalty can be selectively increased so that crisp edges have a lower penalty cost than blurred edges.

As a second example, the neural network could increase the dynamic range of the interpolated image by adding a penalty to pixels if the dynamic range of the neighborhood is smaller than that of the target image, and using SSE otherwise.

The neural network training is not limited to the combination of generating error images, formulating errors that penalize undesirable patterns, and computing derivatives of the penalized errors with respect to spatial neighborhoods. As a first example, a neural network may be trained by computing errors in a spatial neighborhood, but formulating errors that do not exploit the spatial neighborhoods (e.g., SSE). As a second example, a neural network may be trained by computing errors in a spatial neighborhood, formulating errors that penalize some other spatial patterns (not necessarily patterns that visible) in the error image, and computing derivatives of the penalized errors with respect to the network outputs..

The neural network could be trained using an optimization function (e.g., a genetic algorithm, simulated annealing) that does not require or utilize error gradients or derivatives. Instead, the training would be based on the error function.

Figure 8:
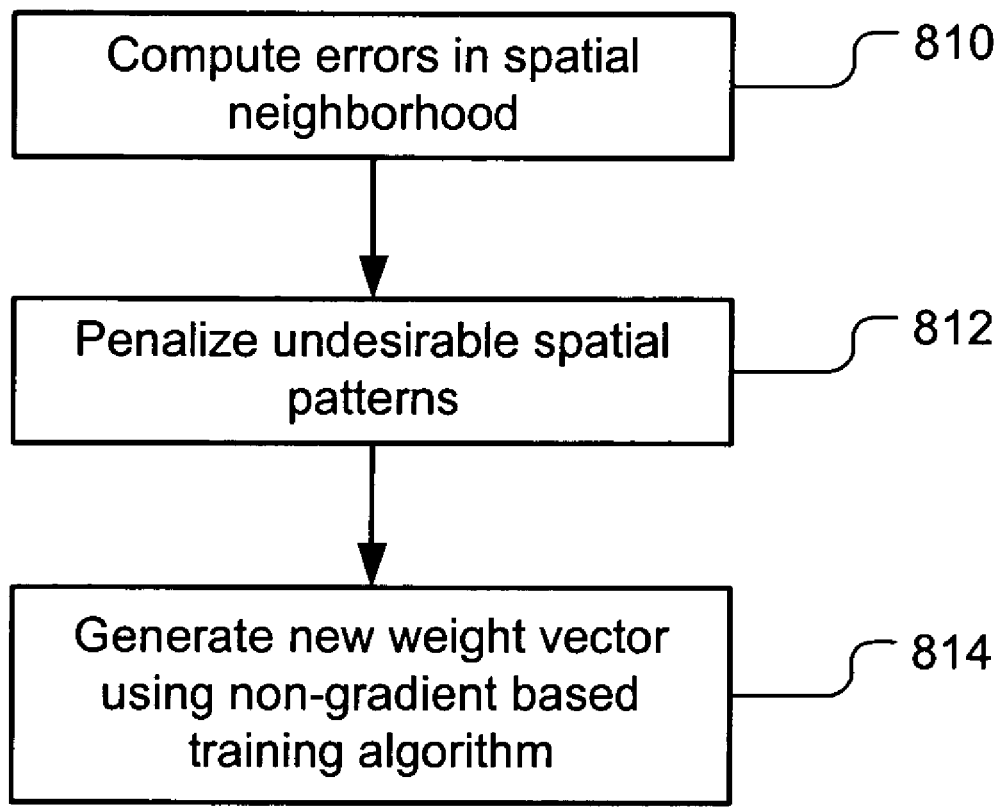
FIG. 8 illustrates a method of training a neural network in accordance with another embodiment of the present invention.

Reference is made to FIG. 8. Non-gradient based training may include the following steps. Errors in a spatial neighborhood are computed (810); and the errors are combined in a way that penalizes undesirable spatial patterns (say, particular correlations) in the error image (812). This combination produces the desired spatial errors. Errors are then reduced by generating a new weight vector using the non-gradient based training algorithm (814).

Figure 6A:
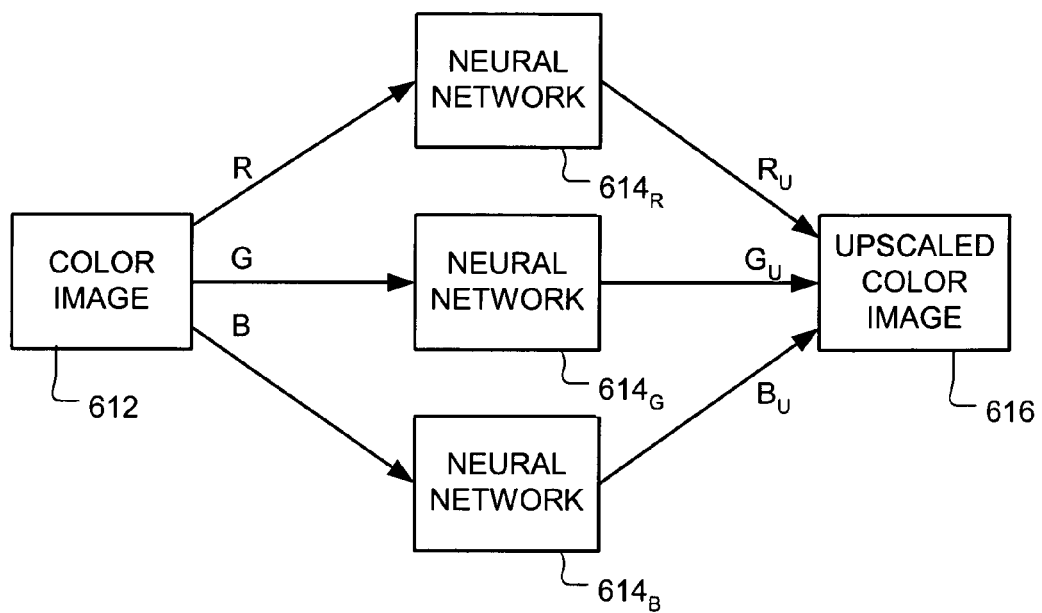
FIGS. 6a-6c are illustration of methods of upscaling a color image in accordance with different embodiments of the present invention.

The neural network is not limited to operating on luminance information. The neural network can be applied to color images in several ways, including but not limited to the following. If the input image is given in non-perceptual color space such as RGB, neural networks $614_R$, $614_B$ and $614_G$ can be applied separately to each channel, as shown in FIG. 6a. Outputs of the neural networks $614_R$, $614_B$ and $614_G$ provide color components ($R_U$, $G_U$, $B_U$) of an upscaled color image 616.

Figure 6B:
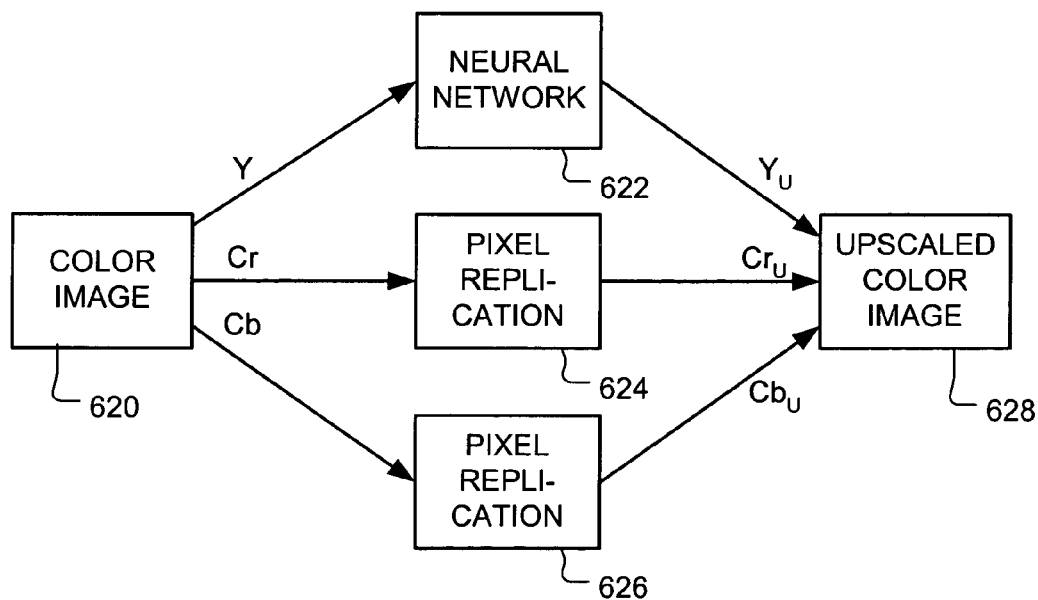

In another embodiment, an input image 620 is given as a luminance-chrominance representation, and different types of upscaling are applied to the luminance and chrominance channels. A simple example is shown in FIG. 6b. The luminance channel (Y) is upscaled using the neural network 622, while the chrominance channels (Cr, Cb) are upscaled by pixel-replication 624, 626 (based on the fact that the human visual system is has a lower spatial sensitivity to chrominance relative to luminance information). An upscaled image 628 is formed from the upscaled channels ($Y_U$ $Cr_U$, $Cb_U$).

Figure 6C:
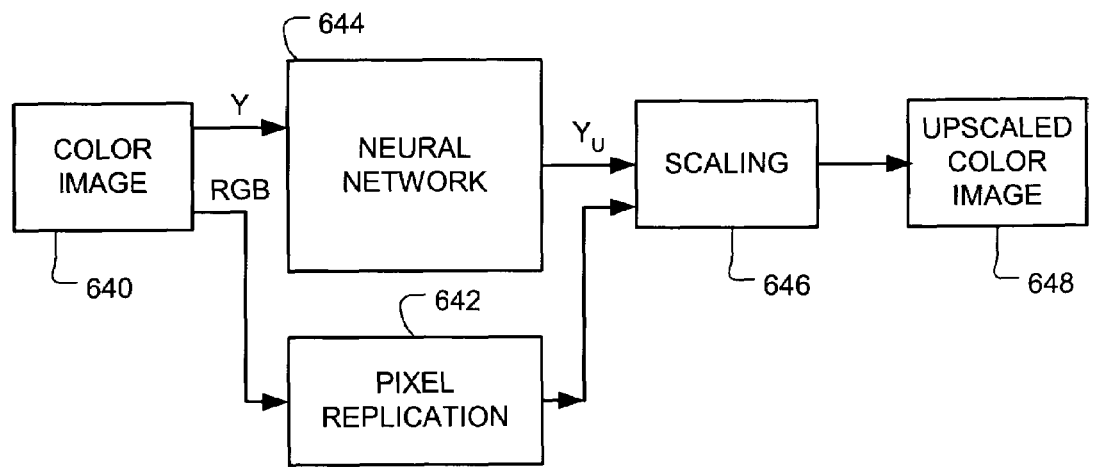

Another example is shown in FIG. 6c. An input image 640 is given as an RGB representation. The input image 640 is upscaled by pixel replication 642 (e.g., each pixel in the input image 640 is replaced by an N×N block of pixels with identical RGB values). A luminance channel (Y) of the input image 640 is supplied to a neural network 644, and an output of the neural network 644 provides an upscaled luminance channel ($Y_U$).

The upscaled luminance channel ($Y_U$) and the pixel-replicated image are used (at block 646) to generate an upscaled color image 648. For example, for each pixel in the upscaled color image 648 is generated by adding a delta to the corresponding pixel in the pixel-replicated image. The delta is computed as the difference between the corresponding luminance value in the upscaled luminance channel ($Y_U$) and the corresponding luminance value in the input luminance channel (Y) (that is, the delta is equal to the difference between the high and low resolution luminance values). The resulting high-resolution R,G,B values in each block of the upscaled image 648 corresponds to the upscaled luminance channel and to the original chrominance value of the original low-resolution pixel.

If any of the upscaled R,G,B values of the upscaled image 648 is outside of the RGB gamut, a gamut-clipping operation may be applied. Each R,G,B value may be clipped separately to the allowed range, or a more sophisticated gamut-mapping method may be used to preserve perceptual attributes such as hue. One such gamut-mapping method is disclosed in U.S. Ser. No. 10/377,911 entitled "System and method of gamut mapping image data" and filed on Feb. 28, 2003. Using the method of FIG. 6c, a color image is upscaled without computing chrominance channels explicitly.

In still another embodiment, the chrominance information may be upscaled using a neural network or another (simpler) method of upscaling which is more accurate than pixel replication but also faster than the neural network. Preferably, the chrominance is upscaled in polar representation, i.e. chroma-intensity is upscaled separately than the hue information. Pixel replication may be performed on the hue channel.

Neural networks according to the present invention are not limited to single high resolution pixel at a time, and be given as additional inputs the offset of the high resolution pixel within the low resolution input pixel. Using this approach, a single neural network could be trained for multiple upscaling factors.

Neural networks according to the present invention are not limited to image upscaling alone. In addition to learning how to interpolate images, it may be desirable to do simple image processing at the same time, such as selective sharpening, smoothing, or darkening. This can be accomplished by training the neural network using target images that incorporate the desired imaging effects.

The neural networks according to the present invention are not limited to upscaling image data. The neural networks could be trained to rescale image data and other dimensional data. For example, the neural network could rescale one-dimensional time-series data (whereas upscaling might be considered specific to image data, re-scaling covers image data as well as other dimensional data). A temporal neighborhood in 1-D would be "spatial" in the temporal domain (e.g. occurrences nearby or adjacent in a time series).

There is no preferred hardware implementation for the method of training the neural networks according to the present invention, and there is no preferred hardware implementation for the trained neural networks. An exemplary hardware implementation for both the training of neural networks and a trained neural network is illustrated in FIG. 7.

Figure 7:
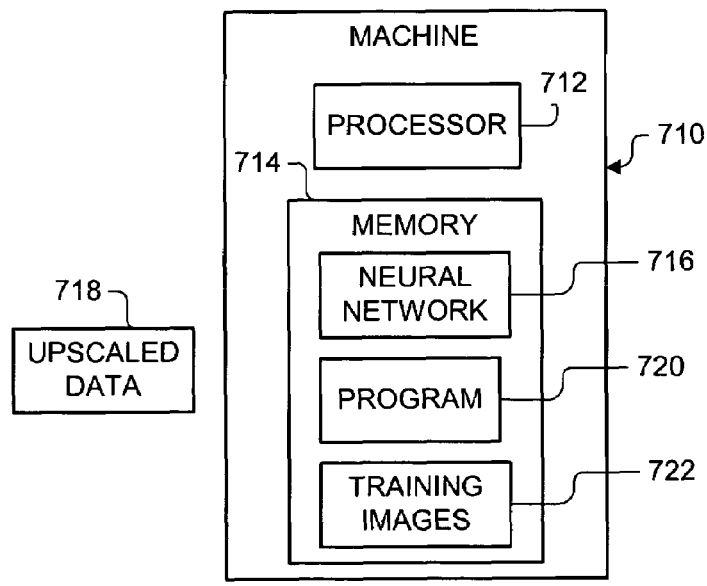
FIG. 7 is an illustration of an apparatus in accordance with an embodiment of the present invention.

Referring to FIG. 7, a computer 710 includes a processor 712 and computer memory 714. The memory 714 stores the details of the trained neural network 716, including information about the weights of the input, hidden and output nodes. The upscaled data may be handled in a variety of ways. It may be stored in the computer memory 714, transmitted over a network, stored in removable memory (e.g., an optical disc) 718, etc.

The neural network 716 may be trained in the same computer 710 or a different computer. If the neural network 716 is trained on the same computer 710, the memory 714 may also store a program 720 and training images 720 for training the neural network 716 in accordance with the method described above.

The computer 710 may have a buffer that can hold as many past network states as will be needed for future error computations during training. For a two dimensional signal (which, at least for images, is usually read in horizontal strips), an error neighborhood with height m for a network with n hidden and output nodes would be allocated storage for m×w floating point vectors of length n, where w is the width of the signal strips.

The present invention is not limited to the specific embodiments described above. Instead, the present invention is construed according to the claims the follow.

The invention claimed is:

1. A method of using a computer to train a computer-based neural network with input image data, the neural network including a plurality of connection weights, the method comprising: using the neural network to rescale the input image data; determining errors for the rescaled data; and using neighborhoods of the errors to adjust the connection weights.

2. The method of claim 1, wherein the input data represents a set of images, wherein the data rescaling includes image upscaling, and wherein the neighborhoods are spatial error neighborhoods.

3. The method of claim 1, wherein the error neighborhoods are used with a non-gradient algorithm to adjust the connection weights.

4. The method of claim 1, wherein the error neighborhoods are used to generate derivatives of total error with respect to a neighborhood of errors; wherein gradients are computed from the derivatives; and wherein the gradients are used to adjust the connection weights.

5. The method of claim 4, wherein each derivative is computed as the sum of the partial derivatives of the errors in an error neighborhood.

6. The method of claim 4, wherein each derivative of total error with respect to a neighborhood of errors is proportional to a product of a penalty matrix and an error vector, the error vector describing the neighborhood of errors, the penalty matrix punishing any spatially correlated errors.

7. The method of claim 6, wherein the penalty matrix is positive definite, and includes weights that penalize undesirable patterns of errors.

8. The method of claim 6, wherein the penalty matrix is based on use of a pattern detector that detects the spatially correlated errors.

9. The method of claim 1, wherein determining the errors includes forming an error image from the rescaled data, identifying patterns in the error image, and punishing the spatially correlated errors in the error image.

10. The method of claim 1, wherein input and output data of the neural network are coded to improve the neural network accuracy.

11. The method of claim 1, wherein the errors are a combination of SSE and spatial errors.

12. The method of claim 11, wherein SSE is applied to crisp edges and spatial errors are applied to blurred edges.

13. A method of upscaling an input image, the method comprising using the neural network trained according to claim 1.

14. The method of claim 13, wherein the input and upscaled images are color images; wherein the input image is upscaled by pixel replication; a luminance channel of the input image is upscaled by the neural network; and the upscaled luminance channel and the pixel-replicated image are used to generate the upscaled color image.

15. The method of claim 14, wherein the using the upscaled luminance channel and the pixel-replicated image include adding deltas to pixels in the pixel-replicated image, each delta computed as the difference between the corresponding luminance value in the upscaled luminance channel and the corresponding luminance value in the input luminance channel.

16. The method of claim 15, wherein using the upscaled luminance channel and the pixel-replicated image further includes gamut mapping the upscaled image.

17. An article comprising computer memory encoded with data upscaled by the neural network trained according to the method of claim 1.

18. Apparatus comprising a processor programmed with a neural network, the network trained according to the method of claim 1.

19. A method of using image input data and target data to train a neural network for image upscaling, the method comprising:
using the neural network to generate predicted values from the input data;
determining errors for the predicted values, the error for each predicted value a function of differences between predicted values in a spatial neighborhood and the corresponding values in the target data; and
back-propagating the errors through the neural network.

20. Apparatus for training a neural network on input data, the apparatus comprising:
means for using the neural network to rescale the input data;
means for determining errors for the rescaled data; and
means for using neighborhoods of the errors to adjust the connection weights.

21. Apparatus for training a neural network on input data to perform image rescaling, the neural network having a plurality of connection weights, the apparatus comprising a processor programmed to use the neural network to rescale the input data; determine errors for the rescaled data; and use neighborhoods of the errors to adjust the connection weights of the neural network.

22. The apparatus of claim 21, wherein the input data represents images, wherein the neural network upscales the image data, and wherein the neighborhoods are spatial error neighborhoods.

23. The apparatus of claim 21, wherein the processor is programmed to use the error neighborhoods and a non-gradient algorithm to adjust the connection weights.

24. The apparatus of claim 21, wherein the error neighborhoods are used to generate derivatives of total error with respect to a neighborhood of errors; wherein gradients are computed from the derivatives; and wherein the gradients are used to adjust the connection weights.

25. The apparatus of claim 24, wherein each derivative is computed as the sum of the partial derivatives of the errors in an error neighborhood.

26. The apparatus of claim 24, wherein each derivative of total error with respect to a neighborhood of errors is proportional to a product of a penalty matrix and an error vector, the error vector describing the neighborhood of errors, the penalty matrix punishing any spatially correlated errors.

27. The apparatus of claim 26, wherein the penalty matrix is positive definite, and includes weights that penalize undesirable patterns of errors.

28. The apparatus of claim 26, wherein the penalty matrix is based on use of a pattern detector that detects the spatially correlated errors.

29. The apparatus of claim 21, wherein determining the errors includes forming an error image from the rescaled data, identifying patterns in the error image, and punishing the spatially correlated errors in the error image.

30. The apparatus of claim 21, wherein the processor is programmed to code input and output data of the neural network to improve the neural network accuracy.

31. The apparatus of claim 21, wherein the errors are a combination of SSE and spatial errors.

32. The apparatus of claim 21, wherein the input and upscaled images are color images; wherein the processor is programmed to upscale the input image by pixel replication, use the neural network to upscale a luminance channel of the input image; and generate the upscaled color image from the upscaled luminance channel and the pixel-replicated image.

33. The apparatus of claim 32, wherein the processor is further programmed to perform gamut mapping of the upscaled image.

34. Apparatus for rescaling a color image, the apparatus comprising:

means for rescaling the input image by pixel replication;

a neural network that has been trained to rescale a luminance channel of the color image, the neural network for producing a rescaled luminance image; and means for using the rescaled luminance image and the pixel-replicated image to generate a rescaled color image.

35. The apparatus of claim 34, wherein the use of the rescaled luminance image and the pixel-replicated image includes adding deltas to pixels in the pixel-replicated image, each delta computed as the difference between the corresponding luminance value in the rescaled luminance image and the corresponding luminance value in the input luminance channel.

36. The apparatus of claim 32, further comprising means for gamut mapping the rescaled color image.

37. An article for causing a processor to use input image data to adjust connection weights of a neural network so the neural network can perform image rescaling, the article comprising:

computer memory; and data encoded in the computer memory, the data causing the processor to use the neural network to rescale the input image data; determine errors for the rescaled data; and use neighborhoods of the errors to adjust the connection weights of the neural network.

* * * * *

UNITED STATES PATENT AND TRADEMARK OFFICE
CERTIFICATE OF CORRECTION

PATENT NO. : 7,409,372 B2 Page 1 of 1
APPLICATION NO. : 10/600671
DATED : August 5, 2008
INVENTOR(S) : Carl Staelin et al.

It is certified that error appears in the above-identified patent and that said Letters Patent is hereby corrected as shown below:

Column 10, line 31, delete "limited to" and insert -- limited to upscaling at a single scaling factor. The neural networks can be configured to output a --, therefor.

Signed and Sealed this

Twenty-eighth Day of April, 2009

JOHN DOLL
*Acting Director of the United States Patent and Trademark Office*